United States Patent
Anderson et al.

(10) Patent No.: US 7,834,481 B2
(45) Date of Patent: Nov. 16, 2010

(54) THRESHOLD DETECTION IN BACK-UP POWER SUPPLY SYSTEMS

(75) Inventors: John D. Anderson, Lawrenceville, GA (US); Michael P. Duggan, Snellville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 12/119,735

(22) Filed: May 13, 2008

(65) Prior Publication Data
US 2008/0211479 A1    Sep. 4, 2008

Related U.S. Application Data

(62) Division of application No. 10/690,946, filed on Oct. 22, 2003, now Pat. No. 7,394,172.

(51) Int. Cl.
*H02J 1/00* (2006.01)
(52) U.S. Cl. .......................... 307/85; 307/130
(58) Field of Classification Search .......... 307/85, 307/130; 340/654; 327/408; 326/112
See application file for complete search history.

(56) References Cited

U.S. PATENT DOCUMENTS

| 4,617,473 A | 10/1986 | Bingham |
| 4,642,616 A * | 2/1987 | Goodwin ........... 340/654 |
| 4,908,790 A * | 3/1990 | Little et al. ........... 714/14 |
| 5,191,229 A | 3/1993 | Davis et al. |
| 5,306,961 A | 4/1994 | Leo |
| 5,373,225 A | 12/1994 | Poletto et al. |
| 5,886,561 A | 3/1999 | Eitan et al. |
| 5,945,816 A * | 8/1999 | Marusik ........... 323/273 |
| 6,853,574 B2 | 2/2005 | Singhal |
| 7,053,691 B2 | 5/2006 | Yates et al. |
| 2002/0039034 A1* | 4/2002 | Kohda ........... 326/123 |
| 2005/0088793 A1 | 4/2005 | Anderson et al. |

FOREIGN PATENT DOCUMENTS

EP    0843398    7/1997

* cited by examiner

*Primary Examiner*—Albert W Paladini
*Assistant Examiner*—Daniel Cavallari

(57) ABSTRACT

A threshold detection circuit includes, in one embodiment, a comparator having a first input connection for receiving a backup voltage from a backup power source, a second input connection for receiving a primary voltage from a primary power source, and an output connection for providing an output voltage; a first resistor and a first capacitor that are coupled in series between the first input connection and the output connection; and a second resistor that is coupled between the first input connection and the output connection, and that is coupled in parallel to the series of first resistor and the first capacitor.

13 Claims, 8 Drawing Sheets

US 7,834,481 B2

THRESHOLD DETECTION IN BACK-UP POWER SUPPLY SYSTEMS

CROSS-REFERENCE TO RELATED APPLICATIONS

This application is a divisional of copending U.S. utility application entitled, "Systems and Methods for Switching to a Back-Up Power Supply," having Ser. No. 10/690,946, filed Oct. 22, 2003, which is entirely incorporated herein by reference.

This application is related to copending U.S. utility application entitled, "Back-Up Power Systems," having Ser. No. 12/110,571, filed Apr. 28, 2008, which is a continuation of copending U.S. utility application entitled, "Systems and Methods for Switching to a Back-Up Power Supply," having Ser. No. 10/690,946, filed Oct. 22, 2003.

FIELD OF THE INVENTION

This invention relates in general to providing a back-up power supply, and more specifically to systems and methods for switching to a back-up power supply.

DESCRIPTION OF THE RELATED ART

Much of today's electronic equipment needs a constant power source. When a power supply fails, the switch to a backup supply should be instantaneous such that the load voltage does not dip below a set threshold. Typically diodes are used in an "OR" configuration (i.e. either the main supply or the backup supply delivers power to the load). Many applications, however, have tight voltage tolerances, and the loss through a diode is too great. Therefore, there exists a need for systems and methods for addressing these and/or other problems related to providing a back-up power supply.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF PREFERRED EMBODIMENTS

An embodiment of the invention enables sustained power to DC-input end-use electronics. The embodiment is useful in applications that have primary and backup power sources. If the primary source fails, then the backup source is supplied to the load instead of the primary source. Switches used in this embodiment are very low loss and can pass high currents to the load with very little drop in voltage.

A condition for switching between one source and another is a voltage level of the primary source (Vp). If Vp falls below a threshold set by a comparison circuit, then the load is powered by the back-up power supply. Conversely, if Vp rises above the threshold, then the load is powered by the primary power supply.

Low resistance field effect transistors (FETs) may be used as switches, and may be controlled by a threshold detection circuit. Using FETs enables a commercial "off the shelf" power source to be used, without the need to have a higher voltage source to overcome diode losses.

Figure 1:
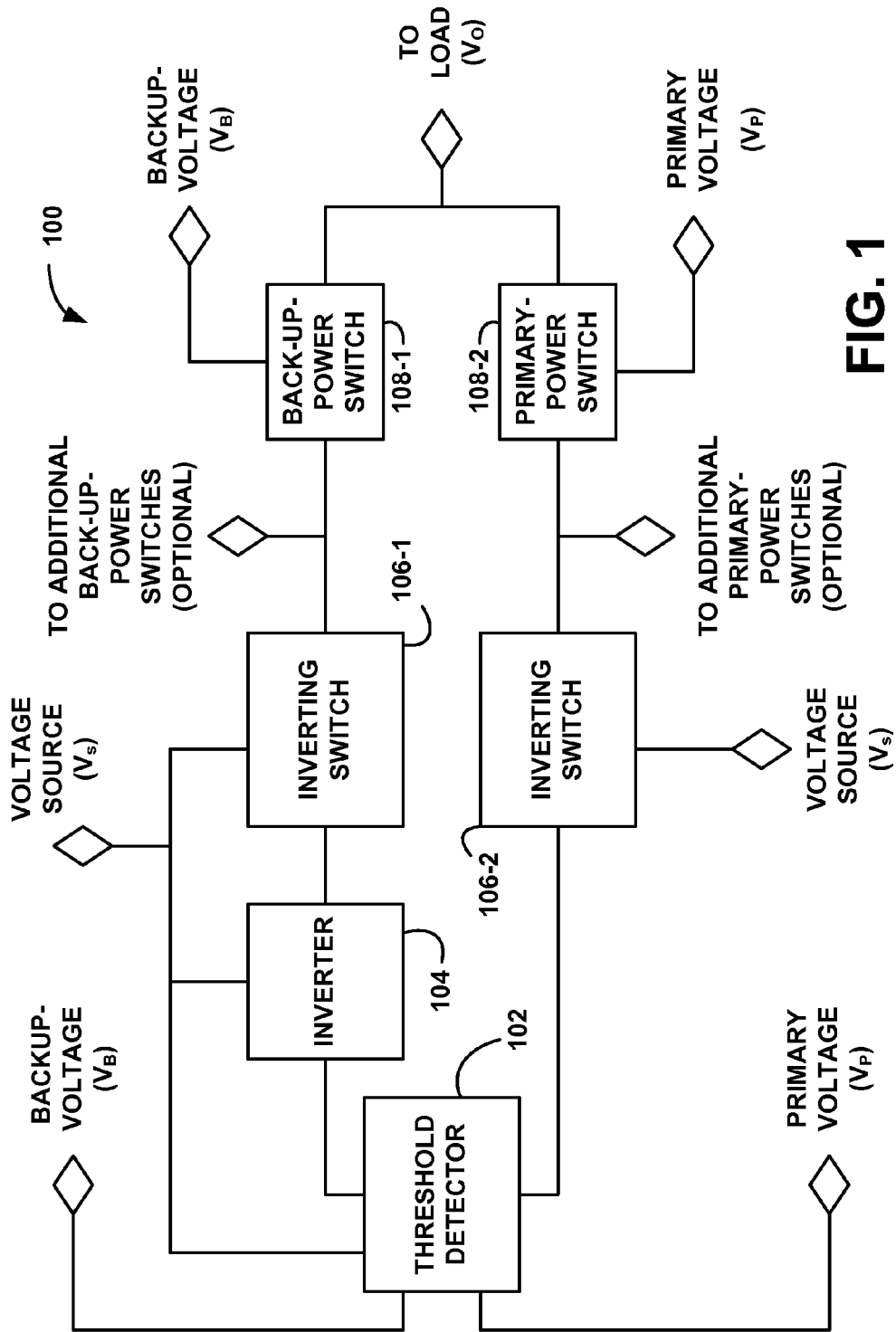
FIG. 1 is a block diagram depicting a power-switching circuit according to an embodiment of the invention.

Below is a detailed description of the accompanying 6 figures, which illustrate a preferred embodiment of the present invention: FIG. 1 depicts an embodiment of a power-switching circuit; FIGS. 2-5 depict examples of components of the power-switching circuit; and FIG. 6 depicts an example of a voltage supply circuit. Note, however, that the invention may be embodied in many different forms and should not be construed as limited to the embodiments set forth herein. Furthermore, all examples given herein are intended to be non-limiting, and are provided in order to help clarify the description of the invention.

FIG. 1 is a block diagram depicting a power-switching circuit 100 according to an embodiment of the invention. The power-switching circuit 100 may be used in many electronic devices that require a constant DC power source. As a non-limiting example, among others, the power-switching circuit 100 may be used in an up-converter device configured to increase the frequency of a signal.

As shown in FIG. 1, the power-switching circuit 100 includes a threshold detector 102 that is coupled to voltages $V_B$ and $V_P$. The threshold detector 102 compares the voltage $V_B$ and the voltage $V_P$ and is operative to turn on or off an inverting switch 106-1 and an inverting switch 106-2 responsive to whether the voltage $V_B$ and the voltage $V_P$ are within a predetermined value. The inverting switch 106-1 and the inverting switch 106-2 are configured to turn on and off in a complementary manner. In other words, when the inverting switch 106-1 is turned on, the inverting switch 106-2 is turned off and vice-versa.

The inverter 104 enables the inverting switch 106-1 to act in a complementary manner to the inverting switch 106-2. In an alternative embodiment the inverter 104 may be coupled between the threshold detector 102 and the inverting switch 106-2. In a preferred embodiment, the inverting switch 106-1 and the inverting switch 106-2 are turned off at a time period set by R12 and C2 of FIG. 4, after a corresponding change in the output of the threshold detector 102. Such a time period may vary between a few microseconds to over 100 milliseconds, depending on the values of R12 and C2. In one embodiment, among others, the time period may be 30 milliseconds. This delayed switching is implemented in order to maintain a constant voltage output of the power-switching circuit 100.

The inverting switch 106-1 and the inverting switch 106-2 are coupled to a back-up power switch 108-1 and to a primary power switch 108-2, respectively. The back-up power switch 108-1 and the primary power switch 108-2 may be coupled to the voltage $V_B$ and the voltage $V_P$, respectively.

When 100 is in operation, the voltage $V_O$ is substantially equal to the voltage $V_P$ if the voltage $V_P$ is within a certain threshold, otherwise the voltage $V_O$ is equal to the voltage $V_B$.

In this manner, when a primary power source fails, a backup power source may be provided to a load.

Figure 2A:
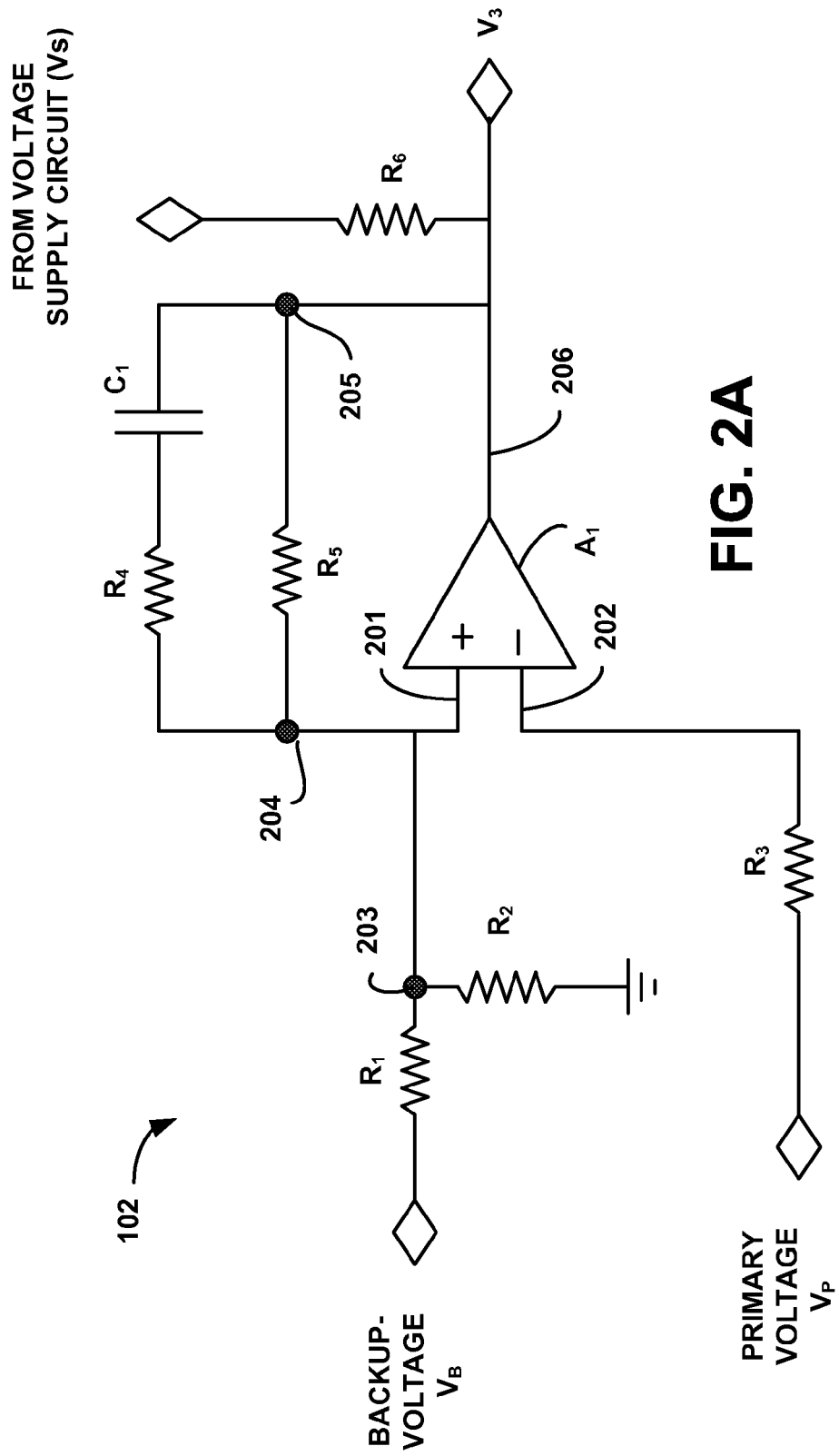
FIG. 2A is a block diagram depicting an example of the threshold detector shown in FIG. 1.

FIG. 2A is a block diagram depicting an embodiment of the threshold detector 102 shown in FIG. 1. The threshold detector 102 receives primary voltage $V_P$ and back-up voltage $V_B$ as inputs and provides voltage $V_3$ as an output. The threshold detector 102 includes a comparator $A_1$ which receives inputs via the connections 201 and 202, and provides an output via a connection 206. The connection 201 is coupled to nodes 203 and 204. A resistor $R_2$ is coupled between node 203 and ground, while a resistor $R_1$ is coupled between node 203 and back-up voltage $V_B$. The resistors $R_1$ and $R_2$ are configured to provide the connection 201 with a predetermined fraction of the back-up voltage $V_B$.

A resistor $R_3$ is coupled between the connection 202 and the primary voltage Vp. A resistor $R_4$ is coupled in series with capacitor $C_1$ between the nodes 204 and 205. A resistor $R_5$ is coupled between the node 204 and the node 205 (i.e., in parallel with R4 and the capacitor $C_1$). The node 205 is coupled to the connection 206. A resistor $R_6$ is coupled between the connection 206 and the supply voltage $V_S$.

When the threshold detector 102 is in operation, the voltage $V_3$ is "low" if the primary voltage $V_P$ is greater than a predetermined fraction of the back-up voltage $V_B$. Conversely, when the primary voltage $V_P$ is less than the predetermined fraction of the back-up voltage $V_B$, then the voltage $V_3$ is "high." This predetermined fraction is based on the relative values of the resistors $R_1$ and $R_2$ as well as the feedback network comprising the resistors $R_4$ and $R_5$, and the capacitor $C_1$. Preferably, the resistor $R_5$ establishes the steady-state component of "hysteresis" while resistor $R_4$ and capacitor $C_1$ create a transient "hysteresis" effect.

Figure 2B:
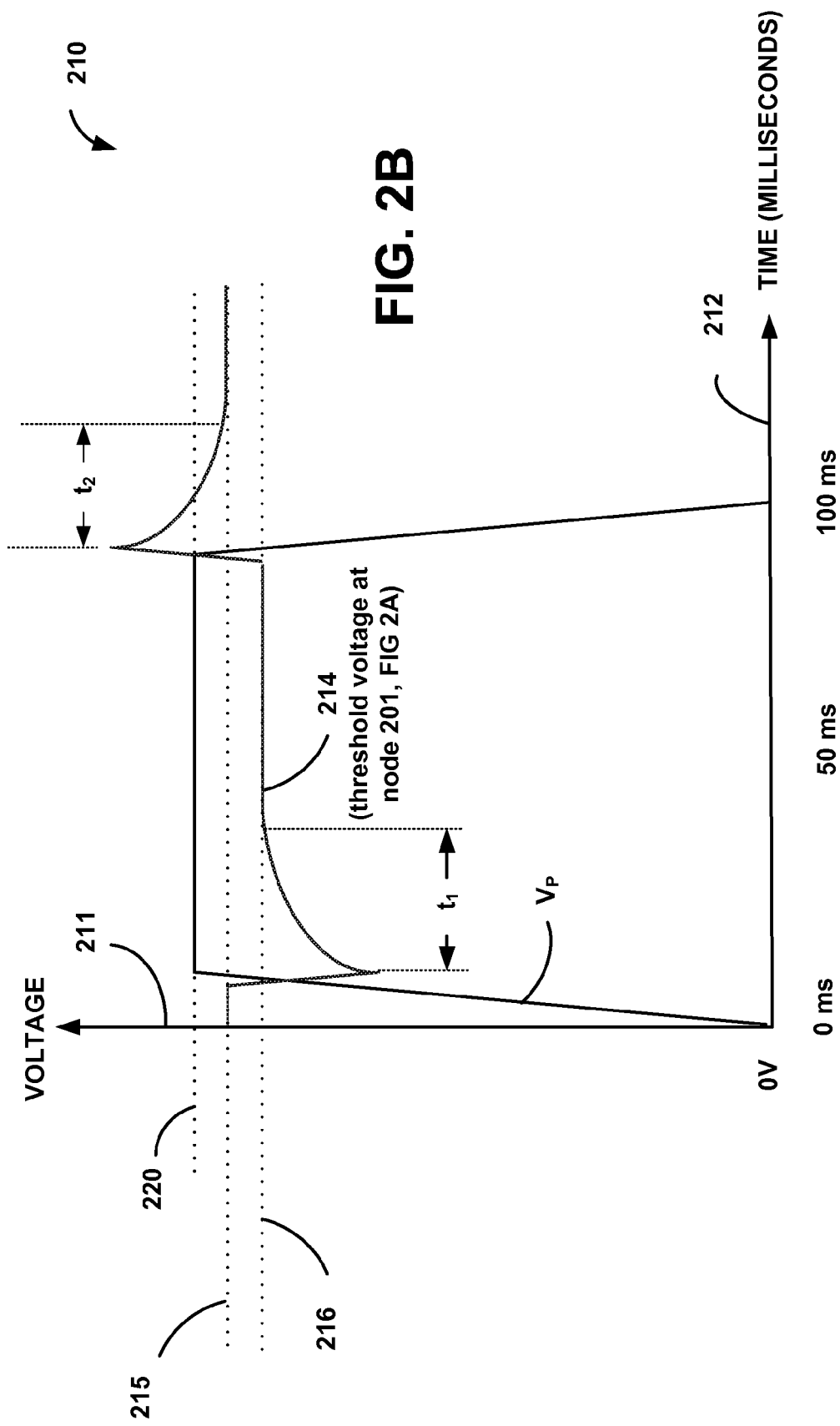
FIG. 2B is a graph illustrating a non-limiting example of a transient hysteresis effect within the threshold detector shown in FIG. 2A.

FIG. 2B is a graph 210 illustrating a non-limiting example of the transient hysteresis effect created by the resistor $R_4$ and the capacitor $C_1$. Also illustrated are the settled values of the threshold created by resistor $R_5$. The settled values are given as levels 215 and 216. The graph 210 has a time axis 212 and a voltage axis 211. As shown in this example, when the primary voltage $V_P$ increases from 0V to its steady state output level 220, the threshold 214 is lowered from level 215 to level 216 after transition period $t_1$. Conversely, as primary voltage $V_P$ decreases from steady state output level 220 to 0V, the threshold 214 is increased from level 216 to level 215 after transition period $t_2$ (where $t_2$ is equal to $t_1$). This transient hysteresis (having transition periods $t_1$ and $t_2$) protects against rapid switching between power sources. Such rapid switching may occur when the source load changes from 0% to full load.

Figure 3:
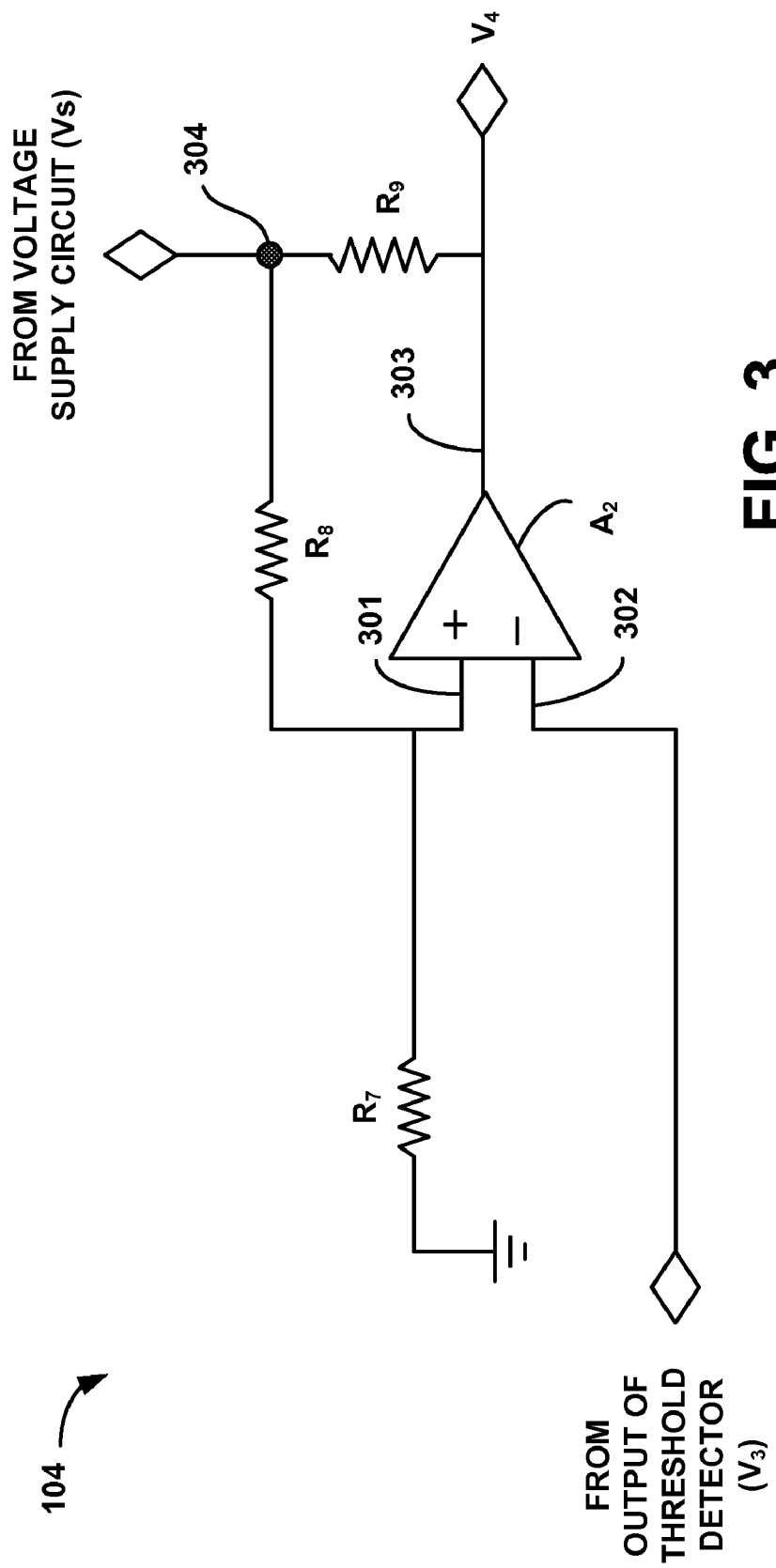
FIG. 3 is a block diagram depicting an example of the inverter shown in FIG. 1.

FIG. 3 is a block diagram depicting an embodiment of the inverter 104 shown in FIG. 1. The inverter 104 receives voltage $V_3$ and outputs voltage $V_4$. The inverter 104 includes a comparator $A_2$, which receives inputs via connections 301 and 302, and provides an output via connection 303. A resistor $R_7$ is coupled between connection 301 and ground, while a resistor $R_8$ is coupled from connection 301 to Vs. This divides the voltage Vs to a lower value based on the values of resistors $R_7$ and $R_8$. The connection 302 is coupled to the voltage $V_3$. A resistor $R_9$ is used to pull up the voltage at connection 303 to approximately Vs when the voltage at 301 is greater than the voltage at 302. When the inverter 104 is in operation, the voltage $V_4$ is "low" when the voltage $V_3$ is "high" and vice versa.

Figure 4:
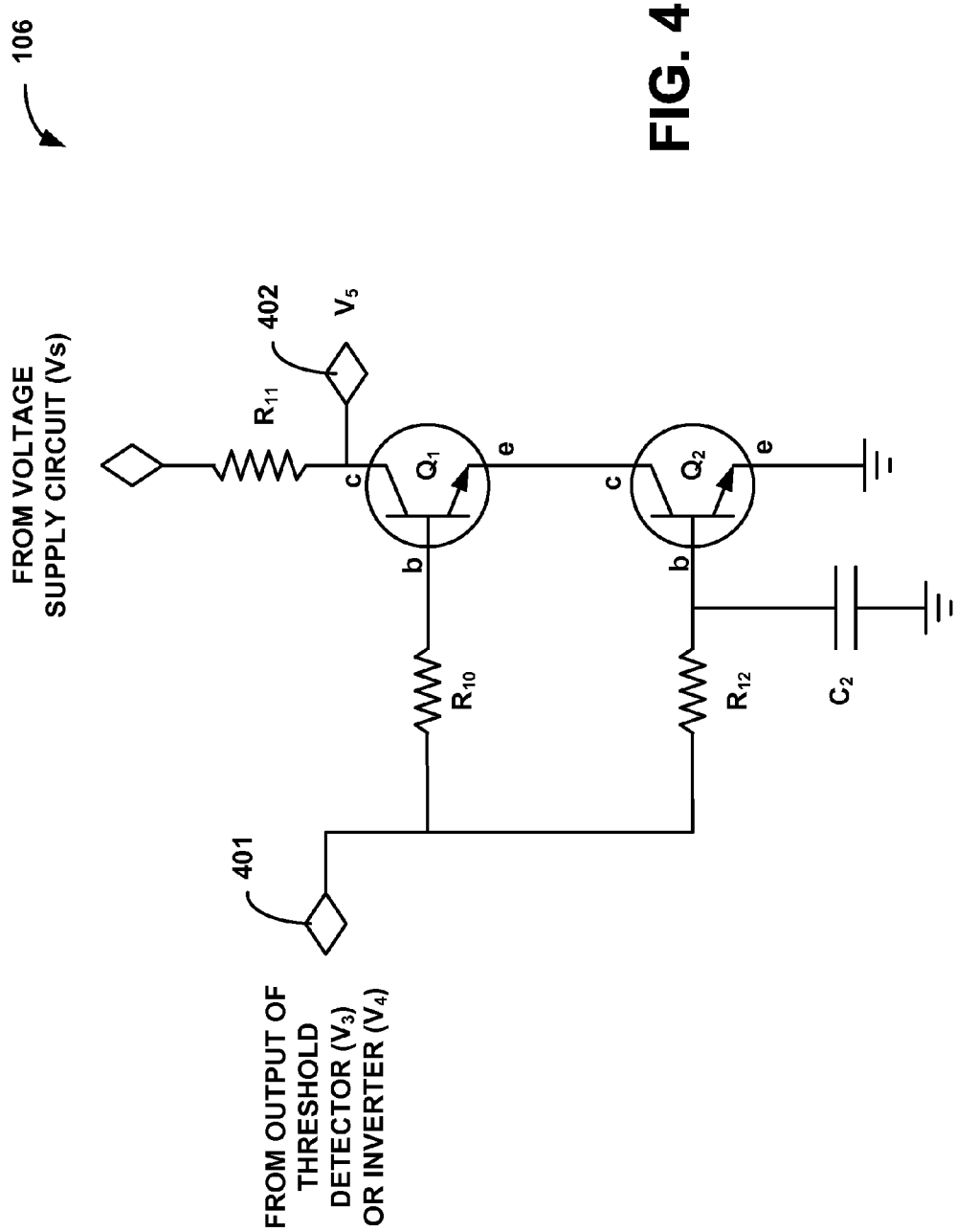
FIG. 4 is a block diagram depicting an example of an inverting switch shown in FIG. 1.

FIG. 4 is a block diagram depicting an embodiment of an inverting switch 106 (e.g., the inverting switch 106-1 or the inverting switch 106-2) shown in FIG. 1. The inverting switch 106 is coupled to voltage $V_3$ or voltage $V_4$ at connection 401, and outputs voltage $V_5$ at the connection 402.

The inverting switch 106 includes the transistors $Q_1$ and $Q_2$, which are coupled as follows: the emitter of the transistor $Q_1$ is coupled to the collector of the transistor $Q_2$; the collector of the transistor $Q_1$ is coupled to the connection 402; a resistor $R_{10}$ is coupled between the base of the transistor $Q_1$ and the connection 401; a resistor $R_{12}$ is coupled between the base of the transistor $Q_2$ and the connection 401; the emitter of the transistor $Q_2$ is coupled to ground; a capacitor $C_2$ is coupled between the base of the transistor $Q_2$ and ground; a resistor $R_{11}$ is coupled between the collector of the transistor $Q_1$ and the supply voltage Vs. The transistors $Q_1$ and $Q_2$ may be, for example, bipolar npn transistors, among others.

When the inverting switch 106 is in operation, the value of the voltage at the connection 401 determines whether the transistors $Q_1$ and $Q_2$ are on (i.e., conducting between their respective collectors and emitters). The transistors $Q_1$ and $Q_2$ are turned on when the voltage at the connection 401 is "high", and vice versa. When the transistors $Q_1$ and $Q_2$ are on, the voltage $V_5$ is "low," and vice versa. The capacitor C2 causes a small delay (for example, among others, 30 milliseconds) between the time that the voltage at the connection 401 transitions from "low" to "high" and the time that the transistor $Q_2$ turns on. A "high" to "low" transition at connection 401 immediately turns off transistor $Q_1$ which causes the voltage $V_5$ to transition "high" regardless of the turn off delay of transistor $Q_2$. This "Instant on-delayed off" switching allows for a more constant voltage output of the power-switching circuit 100 by completely draining the old supply while the new supply is being loaded.

Resistor and capacitor values that may be used in the circuits depicted in FIGS. 2-4 may be, for example, among others, as follows:

TABLE 1

| non-limiting examples of component values | |
|---|---|
| $R_1$ | 11 kilo-ohms |
| $R_2$ | 200 kilo-ohms |
| $R_3$ | 1 kilo-ohm |
| $R_4$ | 51 kilo-ohms |
| $R_5$ | 510 kilo-ohms |
| $R_6$ | 4.7 kilo-ohms |
| $R_7$ | 15 kilo-ohms |
| $R_8$ | 15 kilo-ohms |
| $R_9$ | 4.7 kilo-ohms |
| $R_{10}$ | 300 kilo-ohms |
| $R_{11}$ | 4.7 kilo-ohms |
| $R_{12}$ | 300 kilo-ohms |
| $C_1$ | 0.1 MF (microfarads) |
| $C_2$ | 0.1 MF |

Note that many alternative values for the resistors and capacitors referenced in Table 1 may be used, depending on a desired implementation.

Figure 5:
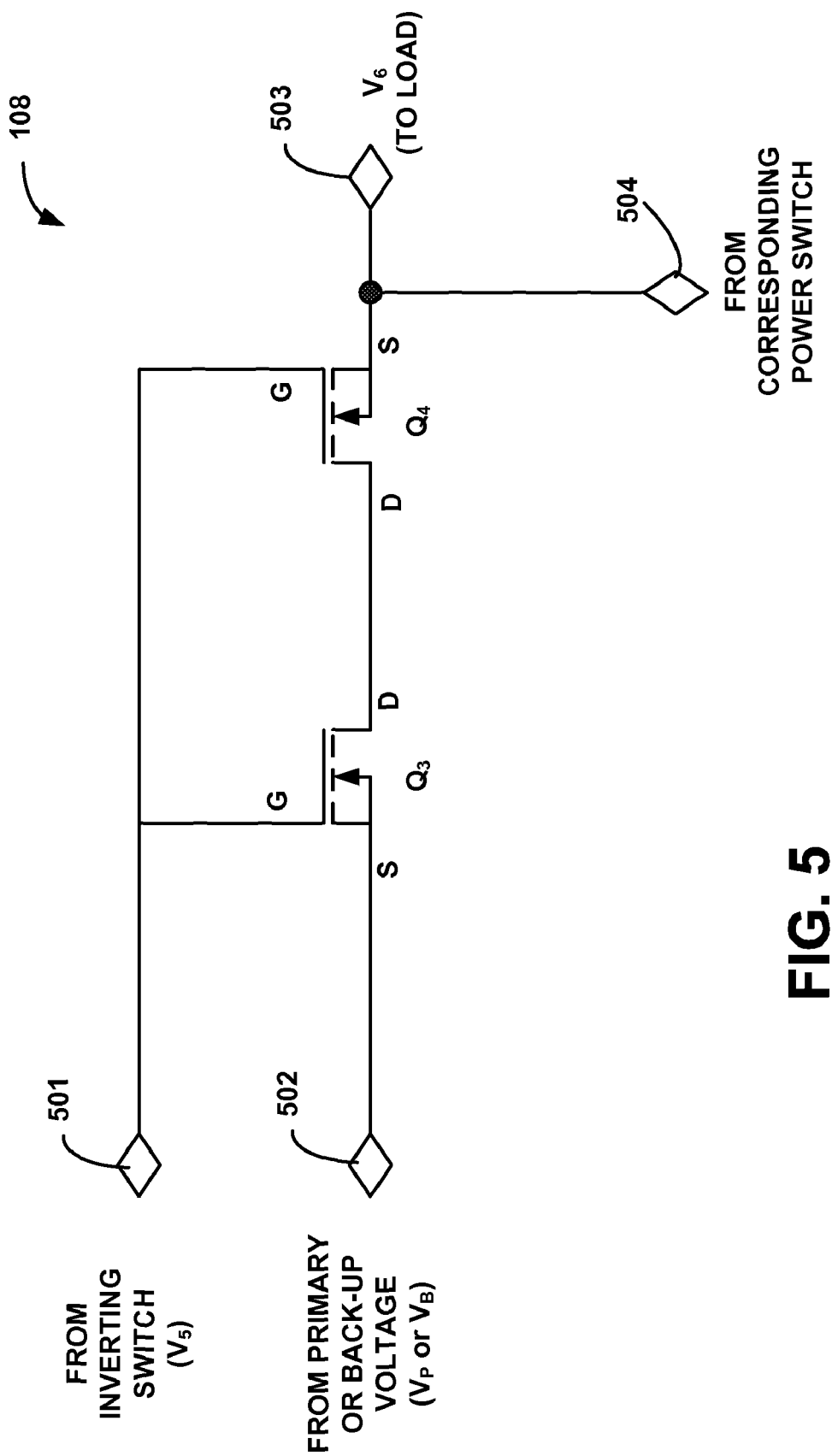
FIG. 5 is a block diagram depicting an example of a power switch shown in FIG. 1.
Figure 6:
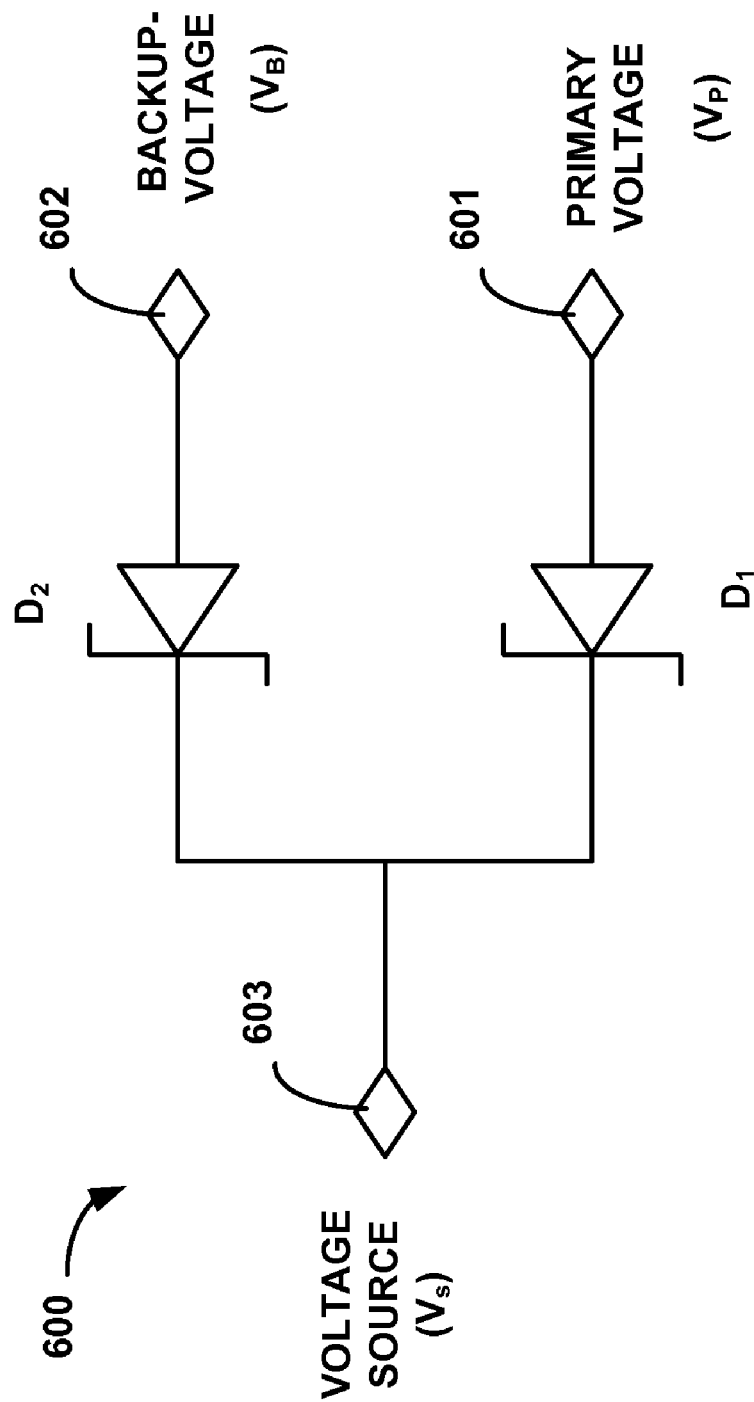
FIG. 6 is a block diagram depicting an example of a voltage supply circuit.

FIG. 5 is a block diagram depicting an embodiment of a power switch 108 (e.g., the back-up power switch 108-1 or the primary power switch 108-2) shown in FIG. 1. The power switch 108 is coupled to the voltage $V_P$ or the voltage $V_B$ at a connection 502, and outputs the voltage $V_6$ at a connection 503.

The power switch 108 includes transistors $Q_3$ and $Q_4$, which are coupled as follows: the gates of the transistors $Q_3$ and $Q_4$ are coupled to the voltage $V_5$; the drains of the transistors $Q_3$ and Q4 are coupled to each other; the source of the transistor $Q_3$ is coupled to the connection 502; the source of the transistor $Q_4$ is coupled to the connection 503.

The power switch 108 is coupled to a corresponding power switch (e.g., the back-up power switch 108-1 (FIG. 1) is coupled to the primary power switch 108-2). When the power switch 108 is in operation, the voltage $V_5$ controls whether the voltage at the connection 502 is equal to the voltage $V_6$ (the voltage at the connection 503). When the voltage $V_5$ is high, the transistors $Q_3$ and $Q_4$ are turned on, and the voltage $V_6$ becomes equal to the voltage at the connection 502. Conversely, when the voltage $V_5$ is low, the transistors $Q_3$ and $Q_4$ are turned off, and the voltage $V_6$ becomes equal to the voltage provided at the connection 504 by the corresponding power switch.

FIG. 6 is a block diagram depicting an embodiment of a voltage supply circuit 600. The voltage supply circuit 600 includes diodes $D_1$ and $D_2$. The diode $D_1$ is coupled between connections 601 and 603, whereas the diode $D_2$ is coupled between connections 602 and 603. The voltages $V_P$ and $V_B$ are provided as inputs to the voltage supply circuit 600 at the connections 601 and 602, respectively. The voltage supply circuit 600 outputs the voltage Vs at the connection 603. The voltage Vs is equal to the voltage $V_B$ or the voltage $V_P$, whichever is higher. Examples of voltage supplies that may be used to provide the voltage $V_B$ or the voltage $V_P$ include, for example, among others, a battery, an AC to DC converter, or a DC/DC converter.

Figure 7:
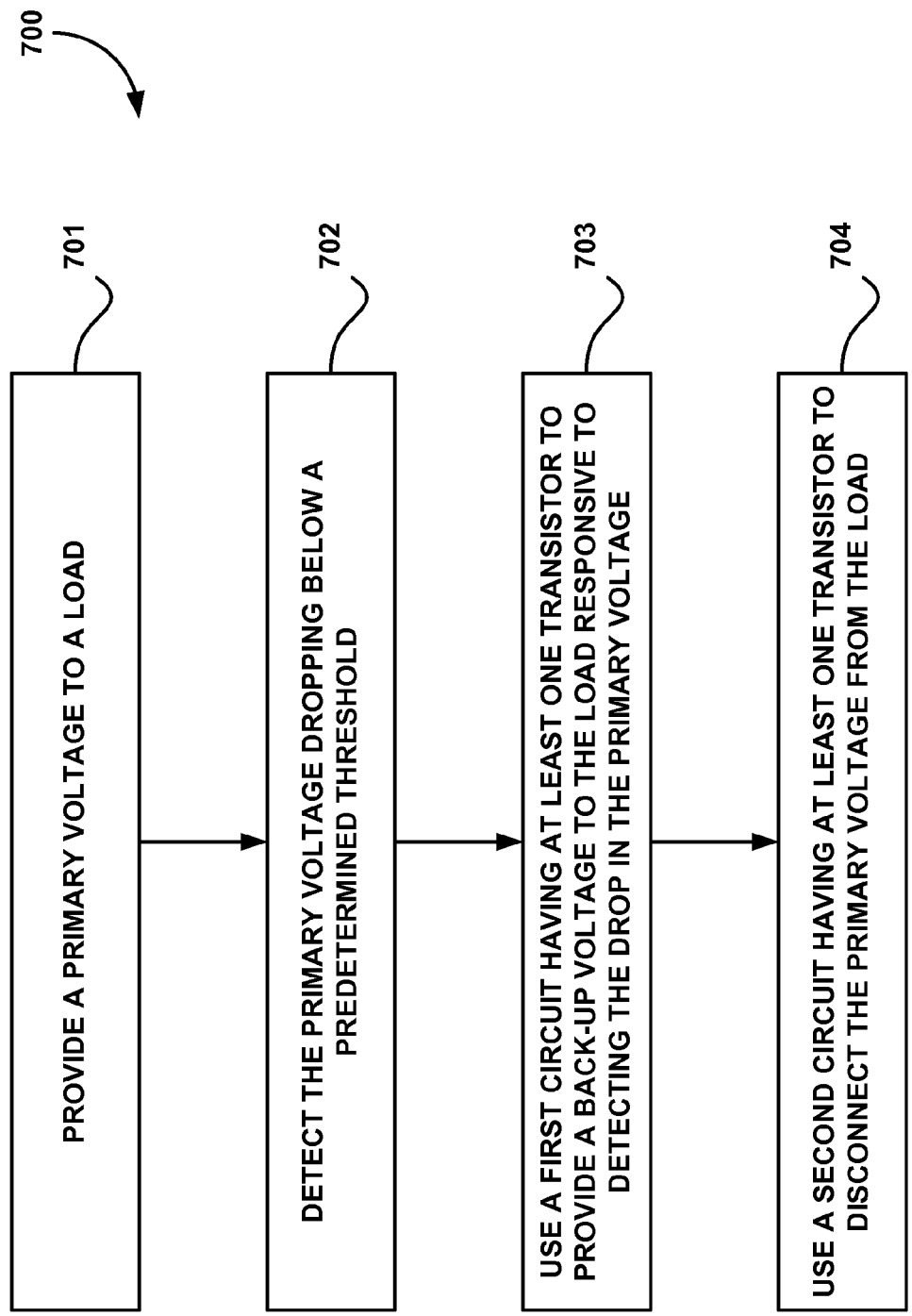
FIG. 7 is a flow chart depicting a method according to one embodiment of the invention.

FIG. 7 is a flow chart depicting a method 700 according to one embodiment of the invention. In step 701, a primary voltage is provided to a load. Then, a drop in the primary voltage below a predetermined threshold is detected, as indicated in step 702. The drop in primary voltage may, for example, be detected using a circuit that is configured in the same or similar manner as the threshold detector 102 (FIG. 2A).

Responsive to the drop in the primary voltage, a first circuit having at least one transistor (e.g., connected in-line) is used to provide a back-up voltage to the load, as indicated in step 703. In addition, a second circuit having at least one transistor is used to disconnect the primary voltage from the load, as indicated in step 704. The first and the second circuits used for implementing steps 703 and 704, respectively, may, for example, each be configured in the same or similar manner as the power switch 108 shown in FIG. 5.

In an alternative implementation, the steps depicted in FIG. 7 may be executed out of order from that shown or discussed, including substantially concurrently or in reverse order, as would be understood by those of ordinary skill in the art. For example, steps 703 and 704 may be executed substantially concurrently. Furthermore, the scope of the invention includes methods having fewer or additional steps than shown in FIG. 7.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A threshold detection circuit for enabling access to a back-up power source, comprising:
    a comparator having a first input connection directly connected to a first resistor that is directly connected to a backup voltage provided by a backup power source, said first input connection directly connected to a second resistor, so that said first and second resistors provide a voltage divider network between said backup voltage and said first input connection, a second input connection directly connected to a third resistor directly connected to a primary voltage provided by a primary power source, and an output connection for providing a comparator output voltage;
    a fourth resistor directly connected to said first input connection and directly coupled to a first capacitor, said first capacitor directly coupled to said comparator output connection;
    a fifth resistor that is directly connected to said first input connection and said comparator output connection, so that said fifth resistor is coupled in parallel to the series of said fourth resistor and the first capacitor, said fourth resistor, said first capacitor and said fifth resistor forming a feedback network;
    wherein an output voltage of said threshold detection circuit is low when said primary voltage is greater than a predetermined fraction of said backup voltage.

2. The threshold detection circuit of claim 1, wherein the threshold detection circuit is configured to cause a first switching circuit to enable access to the back-up power source responsive to the primary voltage provided by the primary power source dropping below a predetermined threshold.

3. The threshold detection circuit of claim 1, further comprising a voltage supply circuit output connection directly coupled to a sixth resistor that is directly coupled to the threshold detector output connection and directly counted to an output of said comparator.

4. The threshold detection circuit of claim 3, wherein said voltage supply circuit comprises a first leg comprising said primary power source directly coupled to a first diode, a second leg comprising said backup power source directly coupled to a second diode, and an output connection directly coupled to said first and second legs.

5. The threshold detection circuit of claim 1, wherein the forth resistor and the first capacitor series arrangement is configured to provide a transient hysteresis effect that enables gradual transitions to settled threshold values in response to changes in voltage levels corresponding to the backup and primary power sources.

6. The threshold detection circuit of claim 5, wherein the settled threshold values are based on the fifth resistor configured in parallel to the fourth resistor and first capacitor series arrangement.

7. The threshold detection circuit of claim 1, wherein said predetermined fraction is based on the relative values of said first and second resistors and said feedback network.

8. A threshold detection circuit, comprising:
    means for comparing voltages corresponding to a backup power source and a primary power source and providing a comparison means output, said backup power source directly connected to a first input of said comparison means via a first resistor and said primary power source directly connected to a second input of said comparison means via a second resistor;
    means for establishing a steady state component of hysteresis corresponding to a duration in transitioning between the backup power source and primary power source directly coupled to said first input of said means for comparing;
    means for establishing a transient component of hysteresis corresponding to a duration in transitioning between the backup power source and primary power source directly coupled to said first input of said means for comparing; and wherein said threshold detection circuit output comprises a low voltage when said voltage corresponding to said primary power source is greater than a predetermined fraction of said voltage corresponding to said backup voltage source; and wherein said threshold detection circuit output is directly coupled to a voltage supply circuit output.

9. The threshold detection circuit of claim 8, wherein said threshold detection circuit output comprises a high voltage if a primary voltage corresponding to the primary power source is less than a predetermined fraction of a backup voltage corresponding to the backup voltage source.

10. The threshold detection circuit of claim 8, wherein the means for establishing the steady state component comprises a resistor directly coupled to an output connection of the means for comparing and providing and directly coupled to an input connection of the means for comparing and providing.

11. The threshold detection circuit of claim 8, wherein the means for establishing a transient component comprises a series resistor-capacitor (RC) circuit directly coupled to an output connection of the means for comparing and providing and directly coupled to an input connection of the means for comparing and providing, said RC circuit.

12. The threshold detection circuit of claim 8, wherein said voltage supply voltage circuit comprises one of said voltage corresponding to said primary power source and said voltage corresponding to said backup power source.

13. The threshold detection circuit of claim 12, wherein said voltage supply circuit comprises a first leg comprising said primary power source directly coupled to a first diode, a second leg comprising said backup power source directly coupled to a second diode, and an output connection directly coupled to said first and second legs.

* * * * *